United States Patent [19]

Nakahira et al.

[11] Patent Number: 5,070,587

[45] Date of Patent: Dec. 10, 1991

[54] ROLL FOR USE IN HEAT TREATING FURNACE AND METHOD OF PRODUCING THE SAME

[75] Inventors: Akira Nakahira, Chiba; Yoshio Harada; Noriyuki Mifune, both of Hyogo, all of Japan

[73] Assignee: Tocalo Co., Ltd., Hyogo, Japan

[21] Appl. No.: 566,168

[22] Filed: Aug. 9, 1990

[30] Foreign Application Priority Data

Aug. 17, 1989 [JP] Japan .................................. 1-210670

[51] Int. Cl.[5] ......................... B21B 31/08; B60B 5/00; B60B 21/00

[52] U.S. Cl. ........................................................ 29/132

[58] Field of Search ...................... 29/132, 121.1, 121.8

[56] References Cited

U.S. PATENT DOCUMENTS

| | | | |
|---|---|---|---|
| 4,391,879 | 7/1983 | Fabian et al. | 29/132 X |
| 4,909,485 | 3/1990 | Yamaguchi et al. | 29/132 X |

FOREIGN PATENT DOCUMENTS

| | | | |
|---|---|---|---|
| 0090428 | 10/1983 | European Pat. Off. | 29/132 |
| 0070712 | 4/1984 | Japan | 29/132 |
| 0029413 | 2/1985 | Japan | 29/132 |
| 0099408 | 6/1985 | Japan | 29/132 |
| 0053249 | 3/1988 | Japan | 29/132 |

OTHER PUBLICATIONS

Japanese Pat. Laid-Open No. 61-23,755, No. 60-141,871, No. 49-81,236, No. 58-141,338 and No. 63-487.

*Primary Examiner*—Howard N. Goldberg
*Assistant Examiner*—C. Richard Martin
*Attorney, Agent, or Firm*—Dvorak and Traub

[57] ABSTRACT

In order to prevent production of build-up resistance and wear resistance on a roll for use in heat treating furnace effectively, an alloy layer, a cermet sprayed layer having reinforced zone and a chemical conversion coating are provide in this order on a roll substrate to form a multi-coating layer.

5 Claims, 1 Drawing Sheet

ROLL FOR USE IN HEAT TREATING FURNACE AND METHOD OF PRODUCING THE SAME

BACKGROUND OF THE INVENTION

The present invention relates to a roll for use in a heat treating furnace, preferably, in a hearth roll with coatings for steel sheet carrying and installed in continuous annealing furnace for producing steel sheets and a method of producing the same. The roll has excellent build-up resistance, heat resistance and wear resistance. The roll operates well under respective atmosphere such as reducing atmosphere, non-oxidizing atmosphere, as a case may be weak oxidizing atmosphere.

When the metal sheet (hereinafter, referred to as "steel sheet") is heat-treated, a plurality of rolls (hearth roll) are installed in the heat treating furnace to carry the steel sheet.

The temperature in the heat treating furnace is controlled in accordance with the kind of steel sheet to be treated and the object, but the heat treating furnace recently operates at a temperature of not lower than 1100° C.

The hearth rolls installed in such a heat treating furnace must support steel sheets under high temperatures, so that the hearth rolls are subjected to large frictional resistances. Therefore, such a hearth roll requires on its surface on excellent heat resistance and wear resistance.

Even in a high temperature circumstance, for example, in a hearth roll used in a heat treating furnace operating under reducing atmosphere, more excellent build-up resistance is required, since once the build-up is caused on the surface of the roll with excellent heat resistance and wear resistance, the carried steel sheet is in contact with this build-up, thereby causing press-scoring on the surface of the steel sheet, resulting in a decrease of value of product.

To overcome such a problem, Japanese Patent Laid-open No. 23,755/86 discloses a method of spraying ceramics of $Cr_2O_3$—$Al_2O_3$ ($Cr_2O_3$ :70~90 wt. %, $Al_2O_3$: balance) solid solution on the surface of the hearth roll. This technique improves pick-up phenomenon on the roll surface, but it has been found that when operating temperature becomes 900° C. or more, a heavily ceramic sprayed coating is susceptible to peeling from the roll surface.

The Japanese Patent Laid-open No. 141,861/85 discloses a method of forming a sprayed coating on a hearth roll with the use of an alloy (Co: 35~55 wt. %, Al: 3~20 wt. %, balance: at least one of Cr, Ni, C, Ta, Y, Mo and Zr). This technique provides a sprayed coating with good adherence, but it is found that a build-up resistance under high temperature operation is not enough and there is effort to improve wear resistance.

The Japanese Patent Laid-open No. 81,236/74 discloses a high-temperature wear-resistant coated article, and a process for producing it, wherein the coated layer comprises metal oxide particles uniformly dispersed in a metal alloy matrix.

This article satisfies the following conditions.

(1) The above metal oxide particles are at least one selected from a group consisting of aluminum oxide, chromium oxide, beryllium oxide, calcium oxide, titanium oxide, niobium oxide, thorium oxide, zirconium oxide, tantalum oxide, silicon oxide, magnesium oxide, hafnium oxide, yttrium oxide, rare earth metal oxide, and a spinel combination of the above metal oxides.

(2) The above metal oxide particles are sized between about 0.05 micron and about 74 microns, and uniformly present in a volume fraction of between about 2% and about 50%.

(3) The metal alloy matrix comprises essentially at least one first metal selected from a group consisting of iron, cobalt and nickel, and at least one second metal selected from a group consisting of aluminum, silicon and chromium, the aggregate of the first metal is at least 40% by weight of the alloy and the aggregate of the second metal is between about 10% and about 40% by weight of the alloy.

(4) The thus obtained coated layer has surface hardness of at least 500VHN.

The sprayed coating obtained by the conventional technique improves heat resistance and wear resistance, but build-up resistance, in case of applying this sprayed coating on the hearth roll for use in the heat treating furnace under a reducing atmosphere and a non-oxidizing atmosphere, is not described at all. These conventional techniques disclose means for uniformly dispersing only metal oxide particles in a metal alloy matrix in order to improve heat resistance and wear resistance of the coated layer. However, it is difficult for such a coated layer to improve the desired build-up resistance. That is, carbide particles play an important role in an improvement for build-up resistance. The conventional techniques do not disclose the dispersion of carbide particles in the metal alloy at all but rather describe that carbide particle is an unsuitable particle for a coating reinforcing component.

As described above, the conventional roll provided with a coating for a heat treating furnace has excellent heat resistance, wear resistance and peeling resistance, but does not exhibit an excellent build-up resistance under high temperature reducible atmosphere. That is, there is a problem to be solved in that the conventional roll does not exhibit a well build-up resistance under a high temperature reducible atmosphere.

SUMMARY OF THE INVENTION

It is an object of the present invention to eliminate the above drawbacks of the conventional roll.

It is another object of the present invention to provide techniques of forming on a roll surface a coating layer having excellent build-up resistance, a good coating adhesive, an excellent heat resistance and a good wear resistance under high temperature reducible atmosphere.

It is a further object of the present invention to provide a hearth roll having a coating layer exhibiting such performances.

It is found that the build-up is caused by a hard contact of the metal (steel sheet) and the metal oxide (ferric oxide) with the roll surface under reducible atmosphere, so that the metal oxide or the like are adhered in micropores which are formed in the coating layer provided on the roll surface.

In order to eliminate the cause of such a build-up, at first an alloy exhibiting excellent adherence is sprayed on the roll surface to form an alloy layer. A mixture of metal (matrix alloy) and carbide particles as well as metal oxide which are efficient to add excellent high-temperature strength and wear resistance is sprayed on the thus sprayed alloy layer to form a reinforced layer. This reinforced layer is coated with a chemical conversion coating of an oxide solution, the surface of the sprayed coating layer is treated with a water solution including a chromium compound to impregnate and seal the micro pores of the reinforced layer. And then, by performing a thermal decomposition at a temperature of 400° C. or more, a hard chromium oxide with wear resistance is finally filled in the micropores of the reinforced layer, thereby obtaining a multi-layer composite coating (coating layer) having a chemical conversion coating as an outermost layer.

That is, according to the present invention, there is provided a roll for use in a heat treating furnace in which composite powders of heat resistant alloy having matrix and non-metallic inorganic reinforcing materials are thermo-sprayed on the surface of a metal roll substrate to form a coating layer having a multi-layer construction; the coating layer formed on the roll substrate comprises an alloy spray-coated layer formed by thermo-spraying heat resistant alloy on the roll substrate; a cermet spray-coated layer is formed by thermo-spraying on the alloy spray-coated layer a cermet consisting of a heat resistance alloy as a matrix and carbide particles or a mixture of carbide and oxide particles which are dispersed in the heat resistant alloy; a chemical conversion coating layer formed by coating on the cermet spray coated layer a metal oxide which is formed by chemical densifying treatment for thermally decomposing a metal oxide solution coatings; and a cermet reinforcement spray-coated zone formed by impregnating a metal oxide separated out on the cermet sprayed layer by the chemical conversion treatment.

It is preferable to determine a thickness ratio of the coating layer as follows.

Alloy sprayed layer: Cermet sprayed layer including reinforced zone: Chemical conversion layer=a:b:c $a=10\sim300\ \mu m$ $b=30\sim300\ \mu m$ $c=0.5\sim20\ \mu m$ The heat resistant alloy is at least two selected from a group consisting of Ni, Co, Cr, Al, Y, Ta, Hf, Ce, Mo, Zr, Ti, S, W.

The composite powder is at least one of a carbide selected from the group consisting of $Cr_3C_2$, NbC, TiC, MoC, WTiC, $ZrC_2$, HfC, VC, TaC, and SiC or a composite powder of the carbide and oxide selected from a group consisting of $Al_2O_3$, $SiO_2$, $Cr_2O_3$, $ZrO_2$, $HfO_2$ and complex oxide thereof.

The metal oxide separated by the chemical densifying treatment is separated by thermo-decomposing an applied coating of chromic acid, aqueous chromate solution or mixed solution including chromium and aluminum component. The cermet for spraying on the alloy spraycoated layer has a composition of carbide of $1\sim30$ weight % or composite particles of $1\sim30$ weight % per the heat resistant alloy of 100 weight parts.

According to the present invention, there is provided a method of producing a roll for use in heat treating furnace which comprises the steps of:

(1) forming an alloy spray-coated layer by thermospraying a heat resistant alloy powder on a roll substrate;

(2) forming a cermet spray-coated layer having a nonmetallic reinforced material dispersed therein by thermo-spraying on the alloy spray-coated layer a mixture of a heat resistant alloy powder and carbide particles or a mixture of carbide and oxide particles; and (3) forming a chemical conversion coating layer by separating the metal oxide by applying and heating a metal oxide solution on the cermet spray-coated layer, at the same time by impregnating a metal oxide into micropores formed in the upper portion of the cermet spray-coated layer thereby forming a cermet sprayed-reinforced zone.

DETAILED DESCRIPTION OF THE PREFERRED EMBODIMENT

Figure 1:
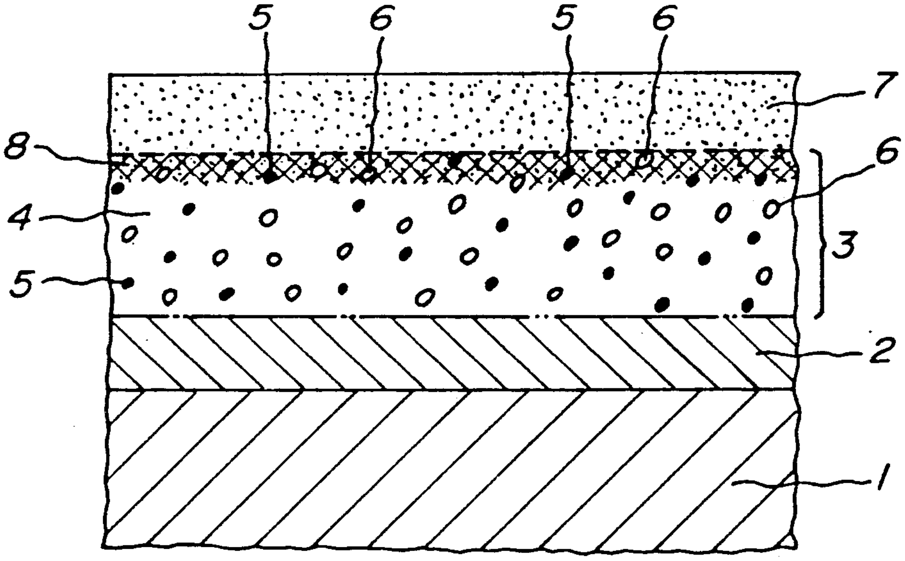
FIG. 1 is a sectional view showing a construction of a coating layer provided on a roll according to the present invention.

The present inventors have studied the cause of build-up formed on a roll surface, and developing a desired coating layer thereon. The results of this study are classified in following cases:

(1) Oxides (in the case of steel sheet, oxides of Fe, Si and Al) or metal powder adhered onto the surface of the steel sheet are displaced and adhered onto the roll surface having oxidation or etching of grain boundary thereon, thereby nucleating and increasing the build-up.

(2) When the roll is operated for a long time under high temperature circumstances, hardness of the roll is decreased, thereby causing scores on the roll surface, so that the oxides or metal powder adhere onto the scored portion of the roll surface, thereby increasing the build-up.

(3) Respective metal oxides for example, $Fe_3O_4$, FeO, $SiO_2$, $Al_2O_3$ are subjected to a solid phase reaction with each other, thereby forming a build-up.

(4) When the roll surface and the steel sheet slip with respect to each other, the surface of the steel sheet is partially fused by frictional heat due to the slip, thereby causing the fused portion to build-up.

(5) The oxide or metal powder present on the surface of the steel sheet adheres to the finely pitted portion of the roll surface, thereby nucleating and forming a build-up.

(6) Active metal powders, caused by reducing the oxide under a reducible atmosphere, adhere onto the roll surface, thereby forming a build up.

As is found from above causes, the following two points are the cause of build-up formation:

(1) Each kind of damage and defect (oxidization, grain boundary etching, score, pit or the like) is formed on the roll surface.

(2) A formation of metal particles due to reduction of an oxide under a reducible atmosphere and an activation of metals. (For example, under the reducible atmosphere, oxide is not formed on the surface of metal sheet and the metal sheet surface becomes chemically active conditioned).

Then, the inventors eliminated the build-up and developed other improvements to satisfy the following considerations.

That is, the coating layer formed on the roll surface is composed of material having a nature in such a manner that the outermost layer (chemical conversion layer) is not reduced under reducible atmosphere. The thus obtained conversion layer has a hardness so as not to cause a score even in contact with the metal sheet. This conversion layer itself is an agglomerate of micro powders separated by thermodecomposing a conversion treating solution (aqueous chromate solution). This separated substance is impregnated into micropores distributed in the surface portion of the sprayed and reinforced layer which is present as an intermediate layer beneath the outermost layer so that these micropores are sealed. This impregnation provides an anchor function, thereby obtaining excellent adherence with the sprayed and reinforced layer. The chemical conversion coating for forming the outermost layer of the coating layers is constructed by using an aqueous solution including, as a solute, a compound formed by thermo-decomposing a chromic acid, dichromic acid, ammonium salts of chromic acid and dichromic acid, nitrate, carbonate or the like, thereby separating a chromium oxide($Cr_2O_3$). This aqueous solution is referred to as "chemical conversion solution." The thus obtained chemical conversion solution is applied onto the cermet sprayed-coated layer as an under layer, and then the surface is dried and heated, thereby forming $Cr_2O_3$ deposit on the upper portion of the cermet spray-coated layer.

A solute deposit produced from the chemical conversion solution is generally very fine due to a heating condition, and remains in the micropores as a deposited product having very fine micro powder shape which is rather in a non-particle shape ($0.05\mu$ or less) as compared with the conventional sprayed particle. The thus produced chromium oxide deposit is not soluble in water, so that even if the above aqueous solution is again applied onto the deposit, this deposit will not dissolve.

In the formation of a chemical conversion coating provided on the cermet spray-coated layer, the steps of application and heating may be repeated, so that the micropores distributed in the cermet spray-coated layer of the under coating are fully filled and sealed with the deposit such as chromium oxide. In this way, the portions other than the upper portion a of the cermet spray-coated layer, are sealed with $Cr_2O_3$ deposit, and are formed with chemical conversion coatings of outermost layer including chromium oxide as a principal ingredient, together with the separated products of the applied chemical conversion solution.

As another compound for forming the chemical conversion coatings having the above effect, in addition to the aqueous solution including chromium, aqueous solution including aluminum may also be used. As such a solution including aluminum, compounds such as aluminum hydroxide, aluminum nitrate, aluminum chloride, aluminum carbonate, ammonium aluminate and the like may be used. These compounds are soluble in water and suspended in a colloidal state to form an aluminum oxide ($Al_2O_3$) through heating, so that chemical conversion coatings may be formed with these compounds under the same treatment as described with reference to chromium oxide.

Chromic acid compounds and aluminum compounds are used in the form of aqueous solution, so that these compounds may also be used by mixing them in proper ratio. In this case, the produced deposits become chemical conversion coatings including both compounds with the same ratio as the above mixing ratio. The heating temperature for forming the chemical conversion coatings including chromium oxide and aluminum oxide is approximately 200°~600° C. The surface hardness of the thus obtained chemical conversion coatings is approximately 900~1500VHN.

The sprayed and reinforced layer having non-metallic particles distributed therein and formed beneath the chemical conversion coatings is explained hereinafter.

The sprayed and reinforced layer which occupies most of the whole coating layers is formed by spraying on the sprayed alloy layer a mixture of metal (alloy) powder and particles such as carbide and oxide in the given ratio. In this case, plasma spraying or flame spraying may suitably be used as a spraying process. The heat resistant alloy, oxide and carbide may be used as a spraying component as follows.

Heat resistant metal (alloy) component:

Metal selected from a group consisting of Ni, Co, Cr, Al, Y, Ta, Hf, Ce, Mo, Zr, Ti and W, or an alloy thereof.

Carbide: Non-metallic particle composed of at least one of $Cr_3C_2$, NbC, TiC, MoC, WTiC, $ZrC_2$, HfC, VC, TaC and SiC.

Oxide: Non-metallic particle composed of at least one of $Al_2O_3$, $SiO_2$, $Cr_2O_3$, $ZrO_2$, $HfO_2$ or a complex oxide of the above metal oxides, such as $ZrSiO_4$.

The component of heat resistant metal (alloy) provides toughness, thermal shock resistance and mechanical shock properties of sprayed coating under high temperature circumstance. Carbide is used as an aggregate serving to increase high-temperature strength of the coating and exhibits a function of resisting force component for the steel sheet. Metal oxide serves as the same aggregate as in the carbide particle and exhibits a chemical stability at a high temperature.

The amount of oxide in the sprayed coating formed by spraying a metal (alloy) in the atmosphere need not be limited as long as unsuitable results do not arise.

The method of forming a sprayed alloy layer on the roll substrate is now explained.

At first, the heat resistant alloy layer directly coated on the roll substrate is formed by spraying an alloy having a given composition of components. The object of using the sprayed alloy layer as an under coating is to obtain excellent adherence to the roll substrate and to (1) increase peeling resistance of the coating layer, (2) provide thermal shock properties to the roll substrate under utilizing circumstances and (3) provide mechanical shock properties due to the contact with the metal plate.

FIG. 1 shows the construction of coating layer formed on the roll substrate according to the present invention.

As shown in FIG. 1, the coating layers according to the present invention comprise a three layer construction. That is, the coating layer comprises, viewing the uppermost layer, a chemical conversion coating formed by chemical densifying method, a sprayed and reinforced layer formed by spraying a material including non-metallic reinforcing particles, and a sprayed alloy layer obtained by spraying a metal alloy.

As shown in FIG. 1, the coating layers according to the present invention show the above three classified layers and comprise a hearth roll substrate (matrix) 1, a sprayed alloy layer 2 of heat resistant alloy matrix 4, carbide particles 5, oxide particles 6 and a chemical conversion coating 7 including $Cr_2O_3$ as a principal component. Reference numeral 8 shows a condition that component ($Cr_2O_3$) of the chemical conversion coating is impregnated or inserted into micropores at the surface portion of the reinforced layer 3, thereby providing a high adherence thereto.

The thickness of each of the multi-layer coating according to the present invention may be selected from the following ranges which exhibit a suitable performance.

| | | |
|---|---|---|
| Alloy spray-coating layer | 10~300 μm | Spray coatings |

-continued

| | | |
|---|---|---|
| Cermet spray-coating layer including of reinforced cermet spray-coating zone | 30~300 μm | |
| Chemical conversion coating | 0.5~20 μm | Chemical conversion coating |

The amount of components for forming respective layers is now explained.

At first, the chemical conversion coating (chemical densified coating) for forming the outermost layer has a composition of $Cr_2O_3$: 100~70% and $Al_2O_3$: 0~30%. In case of using $Al_2O_3$, if the amount of $Al_2O_3$ exceeds 30%, fine hexagonal cracks occur on the coating under utilizing circumstance.

The heat resistant metal (alloy) of the sprayed alloy layer and the sprayed and reinforced layer have the following compositions of components. This alloy includes Co, Ni, Cr, Al, Y as a principal component and it is preferable to make a five-component system alloy. If necessary, the alloy may also include at least one selected from a group consisting of Ta, Ti, W, Mo, Zr, Hf and Ce. In the case of alloy of five-component system, the component has preferablly a range of Co: 5~70 wt %, Ni: 10~50 wt %, Cr: 10~50 wt %, Al: 4~20 wt % and Y: 0.01~3 wt %. The reason why these ranges of compositions are used is as follows.

Co: In the case of less than 5 wt %, high-temperature strength becomes decreased and in the case of more than 70 wt %, fragility becomes a problem.

Ni: In the case of less than 10 wt %, the sprayed coating becomes brittle, while in the case of more than 50 wt %, the bonding force of chemical conversion coating with the sprayed alloy layer is decreased.

Cr: In the case of less than 10 wt %, oxidization resistance and heat resistance are decreased, while in the case of more than 50 wt %, the sprayed coating is likely to be brittle.

Al: In the case of less than 4 wt %, oxidization resistance and heat resistance are decreased, while in the case of more than 20 wt %, the sprayed coating is likely to be brittle.

Y: In the case of less than 0.01 wt %, the effect of adding Y becomes zero, while in the case of more than 3 wt %, the sprayed coating is likely to be brittle.

In addition to the above five-component system, when Ta, Ti, W, Mo, Zr, Ce or Hf is added as a third component to Co—Cr—Al—Y, the component has preferably a ratio of Ta: 1~15 wt %, Ti: 1~15 wt %, W: 1~15 wt %, Mo: 1~15 wt %, Zr: 1~15 wt %, Ce: 1~10 wt %, Hf: 1~10 wt %. In this case, these components do not substantially limit the present invention.

In the preparation of the cermet spray-coating layer, a non-metallic reinforcing material mixed in the matrix alloy uses the following composition. That is, the following components may be preferably added to the above heat resistant alloy.

Carbide (at least one selected from a group consisting of $Cr_3C_2$, NbC, TiC, MoC, WTiC, $ZrC_2$, HfC, VC, TaC and SiC): 1~30 wt %.

Metal Oxide (at least one selected from a group consisting of $Al_2O_3$, $SiO_2$, $Cr_2O_3$, $ZrO_2$, $HfO_2$ and the complex oxide of the above oxides, such as $ZrSiO_4$) 1~30 wt %.

These oxides and carbides are included in the heat resistant alloy with the above composition, thereby improving heat resistance and loading resistance of the cermet spray-coated layer. In this case, when these components have the amount of less than 1%, the above effect becomes very slight, while when these components have the amount of more than 30%, the sprayed coating is likely to be brittle.

In case of adding the reinforcing particles, if oxide particles are added, carbide particles must be always coexistent. However, carbide particles may be independently added, thereby obtaining the expected function (build-up resistance), since the mechanical strength of the carbide particles under high temperature circumstance is larger than in the oxide. Therefore, it is an excellent aggregate. Carbide is stable under a reducible atmosphere and becomes not unstable in changing under an oxidizable atmosphere, so that the high temperature strength may be fully utilized.

The kinds of oxide and carbide are not limited as long as they are subjected to operating conditions of the hearth roll, since when the components are within a range of 1~30%, they exhibit sufficient performance as a coating.

EXAMPLE 1

Figure 2:
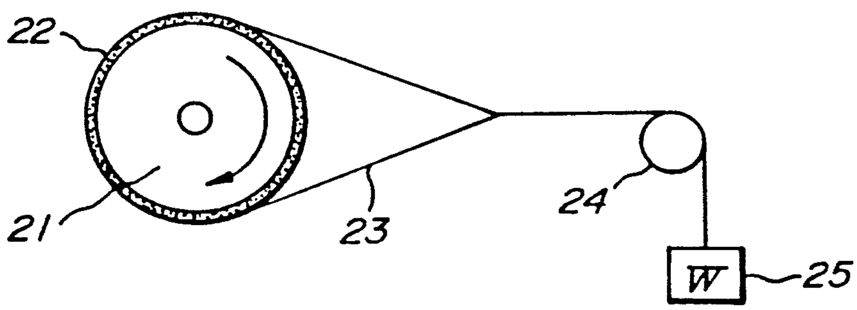
FIG. 2 is an explanatory view showing a build-up test apparatus for evaluating a coating layer formed by the present invention.

FIG. 2 shows a test apparatus for evaluating the coatings obtained by the present invention. This apparatus comprises a sleeve 21 of stainless steel (AISI 304) and a coating 22 to be tested which coating is provided on the outer periphery of the sleeve 21. The apparatus further comprises a wheel of mild steel band 23 (JIS 41, ASTM A 441-79) which is looped about the coating 22 and a weight 25 secured is to one end of the mild steel band 23 through a supporting roll 24. The contacting pressure between the mild steel band 23 and the sleeve 21, which is provided with the coating 22, may be controlled by changing the weight value of the weight 25 and the slip speed may be changed by controlling the rotating speed of the sleeve 21. The whole apparatus, particularly, the sleeve portion is mounted in an electric furnace capable of operating under controled atmospheres, so that the build-up resistance may be tested in various atmospheres, such as air (oxidizable), a gas including $H_2$ (reducible) and Ar, $N_2$ gas (non-oxidizable).

Test conditions:

(1) temperature: 1000° C.

(2) gas atmosphere: air (oxidizable); 3% $H_2$+97% $N_2$ (reducible); Ar (non-oxidizable);

(3) contacting pressure to mild steel band: 20~30 kgf/cm$^2$ (4) time: 3 hours (5) sleeve rotating speed: 20 rpm (6) coatings to be tested: Coatings according to the present invention, coating having component range outside the range of present invention and coatings having sprayed coating structure and component other than those of the present invention as a comparative example.

TABLE 1

| | Conversion coating | | Cermet spray-coating layer inclusive of reinforced cermet spray-coating zone | | | Alloy spray-coating layer | Experimental Results | | | | | |
|---|---|---|---|---|---|---|---|---|---|---|---|---|
| | | | | | | | Oxidizability | | Reducibility | | Nonoxidizability | |
| Number | $Cr_2O_3$ | $Al_2O_3$ | Alloy | Oxide | Carbide | Alloy | build up | peeling | build up | peeling | build up | peeling |
| 1 | 100 | 0 | 95~99 | 0 | 1~5 | 100 | ○ | ○ | ○ | ○ | ○ | ○ |
| 2 | 100 | 0 | 60~80 | 10~20 | 10~20 | 100 | ○ | ○ | ○ | ○ | ○ | ○ |
| 3 | 100 | 0 | 40~50 | 25~30 | 25~30 | 100 | ○ | ○ | ○ | ○ | ○ | ○ |
| 4 | 70 | 30 | 60~80 | 10~20 | 10~20 | 100 | ○ | ○ | ○ | ○ | ○ | ○ |
| 5 | 80 | 20 | 60~80 | 10~20 | 10~20 | 100 | ○ | ○ | ○ | ○ | ○ | ○ |
| 6 | 100 | 0 | 70~75 | 0 | 25~30 | 100 | ○ | ○ | ○ | ○ | ○ | ○ |
| 7 | 100 | 0 | 80~90 | 10~20 | 0 | 100 | ○ | ○ | x | Δ | Δ | Δ |
| 8 | 0 | 0 | 80~90 | 10~20 | 0 | 100 | x | Δ | x | Δ | x | Δ |
| 9 | 0 | 100 | 35~50 | 10~15 | 40~50 | 100 | Δ | Δ | x | Δ | x | Δ |
| 10 | 0 | 100 | 40~50 | 25~30 | 25~30 | 0 | Δ | x | x | x | x | x |
| 11 | 70 | 30 | 50~65 | 25~30 | 10~20 | 0 | x | x | x | x | x | x |

Note:
Acceptable Example No. 1~6
Comparative Example No. 7~11
(build up)
○ : No build-up
Δ: Number of build-up $<10$
x: Number of build-up $\geqq 10$
(peeling)
○ : No peeling
Δ: peeled area $<3$ $cm^2$
x: peeled area $\geqq 3$ $cm^2$ Table 1 shows experimental results as to appearance of a coating after the test. As is found in Table 1, the sprayed coatings according to the present invention exhibited excellent build-up resistance and adherence under all test atmospheres such as oxidizable, reducible and non-oxidizable atmospheres. The reason why the sprayed coatings according to the present invention showed excellent performance under not only reducible and non-oxidizable atmospheres but also under oxidizable atmosphere is due to the presence of $Cr_2O_3$ deposits. These deposits are an agglomerate of $Cr_2O_3$ fine powders separated and produced on the outermost layer by the a chemical conversion treatment through chemical densifying method. This $Cr_2O_3$ deposit is impregnated into not only surface layer but also micropores of upper portion of the cermet spray-coated layer and fully sealed micropores.

As seen from the tests No. 8, 9 and 10 of comparative examples, when the outermost layer has no chemical conversion coating of $Cr_2O_3$ the deposit or the chemical conversion coating of only $Al_2O_3$, the above prevention effect is weak, a build-up is caused and the peeling of the coating occurred even under any atmosphere.

It has been found from the above results that the test coating No. 8 has poor build-up resistance.

Moreover, as in the test No. 7, the sprayed coating including no carbide in the reinforced layer was subjected to a deformation, because of low mechanical strength of the reinforced layer. As shown in test No. 10 and 11, the coating having no alloy layer was peeled off from the boundary of the sleeve 21 and the reinforced layer portion.

EXAMPLE 2

In the test under the same conditions as in Example 1, the test was made under an oxidizable atmosphere for 2 hours under a reducible atmosphere for 2 hours.

TABLE 2

| | Conversion coating | | Cermet spray-coating layer inclusive of reinforced cermet spray-coating zone | | | Alloy spray coating layer | Experimental Results | |
|---|---|---|---|---|---|---|---|---|
| Number | $Cr_2O_3$ | $Al_2O_3$ | Alloy | Oxide | Carbide | Alloy | build up | peeling |
| 1 | 100 | 0 | 95~99 | 0 | 1~5 | 100 | ○ | ○ |
| 2 | 100 | 0 | 60~80 | 10~20 | 10~20 | 100 | ○ | ○ |
| 3 | 100 | 0 | 40~50 | 25~30 | 25~30 | 100 | ○ | ○ |
| 4 | 70 | 30 | 60~80 | 10~20 | 10~20 | 100 | ○ | ○ |
| 5 | 80 | 20 | 60~80 | 10~20 | 10~20 | 100 | ○ | ○ |
| 6 | 100 | 0 | 70~75 | 0 | 25~30 | 100 | ○ | ○ |
| 7 | 100 | 0 | 80~90 | 10~20 | 0 | 100 | Δ | Δ |
| 8 | 0 | 0 | 80~90 | 10~20 | 0 | 100 | x | Δ |
| 9 | 0 | 100 | 35~50 | 10~15 | 40~50 | 100 | x | Δ |
| 10 | 0 | 100 | 40~50 | 25~30 | 25~30 | 0 | x | x |
| 11 | 70 | 30 | 50~65 | 25~30 | 10~20 | 0 | Δ | x |

Note:
Acceptable Example No. 1~6
Comparative Example No. 7~11
(build up)
○ : No build-up,
Δ: Number of build-up $<10$,
x: Number of build-up $\geqq 10$
(peeling)
○ : No peeling
Δ: peeled area $<3$ $cm^2$
x: peeled area $\geqq 3$ $cm^2$ Table 2 shows exprimental results of Example 2. The coatings according to the present invention were not subjected to effects for such test time, even in case of changing the atmosphere during the test. However, the coating in comparative example exhibited a build-up and the peeling.

EXAMPLE 3

Taking the operation for an extended time into consideration, the test was performed under the condition that $Cr_2O_3$ of the outermost layer (chemical conversion coatings) was worn with friction. That is, the sleeve with the same coating as in Example 1 was formed and this sleeve was heated at 1000° C. for 5 hours in the electric furnace and then only the outermost layer (corresponding to chemical conversion coating) was removed by a blasting process for the sleeve (test NO. 1 ~7 and 9~11). The thus obtained coatings were tested under the same conditions as in Example 1.

TABLE 3

| | Conversion coating | | Cermet spray-coating layer inclusive of reinforced cermet spray-coating zone | | | Alloy spray-coating layer | Experimental Results | | | | | |
|---|---|---|---|---|---|---|---|---|---|---|---|---|
| | | | | | | | Oxidizability | | Reducibility | | Nonoxidizability | |
| Number | $Cr_2O_3$ | $Al_2O_3$ | Alloy | Oxide | Carbide | Alloy | build up | peeling | build up | peeling | build up | peeling |
| 1 | 100 | 0 | 95~99 | 0 | 1~5 | 100 | Δ | ○ | ○ | ○ | ○ | ○ |
| 2 | 100 | 0 | 60~80 | 10~20 | 10~20 | 100 | Δ | ○ | ○ | ○ | ○ | ○ |
| 3 | 100 | 0 | 40~50 | 25~30 | 25~30 | 100 | Δ | ○ | ○ | ○ | ○ | ○ |
| 4 | 70 | 30 | 60~80 | 10~20 | 10~20 | 100 | Δ | ○ | ○ | ○ | ○ | ○ |
| 5 | 80 | 20 | 60~80 | 10~20 | 10~20 | 100 | Δ | ○ | ○ | ○ | ○ | ○ |
| 6 | 100 | 0 | 70~75 | 0 | 25~30 | 100 | Δ | ○ | ○ | ○ | ○ | ○ |
| 7 | 100 | 0 | 80~90 | 10~20 | 0 | 100 | x | x | x | Δ | x | Δ |
| 8 | 0 | 0 | 80~90 | 10~20 | 0 | 100 | x | Δ | x | Δ | x | Δ |
| 9 | 0 | 100 | 35~50 | 10~15 | 40~50 | 100 | x | Δ | x | Δ | x | Δ |
| 10 | 0 | 100 | 40~50 | 25~30 | 25~30 | 0 | x | x | x | x | x | x |
| 11 | 70 | 30 | 50~65 | 25~30 | 10~20 | 0 | x | x | x | x | x | x |

Note:
Acceptable Example No. 1~6
Comparative Example No. 7~11
(build up)
○ : No build-up
Δ: Number of build-up <10
x: Number of build-up ≧10
(peeling)
○ : No peeling
Δ: peeled area <3 $cm^2$
x: peeled area ≧3 $cm^2$ Table 3 shows the experimental results of Example 3. The coatings according to the present invention had excellent build-up resistance and adherence of sprayed coatings under reducible and non-oxidizable atmospheres. Under an oxidizable atmosphere, the build-up slightly occured, but this is smaller than the comparative example, since it is considered that the outermost layer was removed by the blasting process, but $Cr_2O_3$ remaining in the micropores of the reinforced layer exhibits a build-up resistance. On the contrary, the coatings in comparative example were fairly inferior in the build-up resistance and the peeling resistance.

What is claimed is;

1. A roll for use in a heat treating furnace having a multi-layer construction comprising: a roll substrate; a coating layer formed on the roll substrate comprising an alloy spray-coated layer formed by thermo-spraying a heat resistant alloy on the roll substrate; a cermet spray-coated layer formed by thermo-spraying on the alloy spray-coated layer a cermet consisting of a heat resistant alloy as a matrix and containing carbide particles or a mixture of carbide and oxide particles which are dispersed in the matrix; a chemical conversion coating layer formed by coating on the cermet spray-coated layer a metal oxide which is formed by a chemical densifying treatment for thermally decomposing metal oxide solution coatings; and a cermet reinforcement spray-coated zone formed by impregnating a metal oxide separated out on the cermet sprayed layer by the chemical conversion treatment.

2. A roll as claimed in claim 1, wherein the heat resistant alloy contains at least two elements selected from a group consisting of Ni, Co, Cr, Al, Y, Ta, Hf, Ce, Mo, Zr, Ti, S and W.

3. A roll as claimed in claim 1, wherein the mixture contains at least one carbide selected from a group consisting of $Cr_3C_2$, NbC, TiC, MoC, WTiC, $ZrC_2$, HfC, VC, TaC, and SiC or composite of the carbide and oxide selected from a group consisting of $Al_2O_3$, $SiO_2$, $Cr_2O_3$, $ZrO_2$, $HfO_2$ and complex oxide thereof.

4. A roll as claimed in claim 1, wherein the metal oxide separated by the chemical densifying treatment is separated by thermo-decomposing an applied coating of chromic acid, aqueous chromate solution or a mixed solution including chromium and aluminum components.

5. A roll as claimed in claim 1, wherein the cermet for spraying on the alloy spray-coated layer has a composition of 1-30 weight % carbide particles or a mixture of carbide and oxide particles and the balance being the heat resistant alloy.

* * * * *